(12) United States Patent
Tanaka et al.

(10) Patent No.: US 12,548,325 B2
(45) Date of Patent: *Feb. 10, 2026

(54) INFORMATION PROCESSING DEVICE, SYSTEM, METHOD, AND NON-TRANSITORY COMPUTER-READABLE MEDIUM STORING PROGRAM FOR APPLYING A BONUS TO A SETTLEMENT PROCESS

(71) Applicant: NEC Corporation, Tokyo (JP)

(72) Inventors: Takanori Tanaka, Tokyo (JP); Hiroshi Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 18/509,660

(22) Filed: Nov. 15, 2023

(65) Prior Publication Data

US 2024/0087313 A1 Mar. 14, 2024

Related U.S. Application Data

(63) Continuation of application No. 17/911,176, filed as application No. PCT/JP2020/014601 on Mar. 30, 2020.

(51) Int. Cl.
*G06Q 30/02* (2023.01)
*G06F 21/32* (2013.01)
(Continued)

(52) U.S. Cl.
CPC .............. *G06V 20/30* (2022.01); *G06F 21/32* (2013.01); *G06Q 30/0236* (2013.01); *G06V 40/172* (2022.01); *G06V 40/50* (2022.01)

(58) Field of Classification Search
CPC ...... G06V 20/30; G06V 40/172; G06V 40/50; G06F 21/32; G06Q 30/0236; G06Q 20/40
See application file for complete search history.

(56) References Cited

U.S. PATENT DOCUMENTS

2010/0089994 A1* 4/2010 Murooka .............. G07F 19/204
235/375
2016/0189162 A1 6/2016 Taira et al.
(Continued)

FOREIGN PATENT DOCUMENTS

JP 2010-092311 A 4/2010
JP 2014-203215 A 10/2014
(Continued)

OTHER PUBLICATIONS

Univesity of Chicago, Too Many Metrics (Year: 2016).*
(Continued)

*Primary Examiner* — Breffni Baggot
(74) *Attorney, Agent, or Firm* — .Sughrue Mion, PLLC

(57) ABSTRACT

An information processing device includes a first authentication controlling unit that causes an authentication device to execute first facial authentication or facial registration of a first photographed image capturing a user at a first store, a presenting unit that presents recommendation information related to a second store to the user in response to a success of the first facial authentication or in response to the facial registration, a second authentication controlling unit that causes the authentication device to execute second facial authentication of a second photographed image capturing the user at the second store, and a bonus applying unit that causes a bonus to be applied to a settlement process of the user at the second store based on a history of the first facial authentication or the facial registration, if the user has been authenticated successfully in the second facial authentication.

10 Claims, 11 Drawing Sheets

(51) Int. Cl.
*G06Q 30/0207* (2023.01)
*G06V 20/30* (2022.01)
*G06V 40/16* (2022.01)
*G06V 40/50* (2022.01)

(56) References Cited

U.S. PATENT DOCUMENTS

2018/0060907 A1* 3/2018 Kobayashi ......... G06Q 30/0254
2024/0153317 A1 5/2024 Inoue

FOREIGN PATENT DOCUMENTS

| | | | |
|---|---|---|---|
| JP | 2014203216 A | * | 10/2014 |
| JP | 2017-068404 A | | 4/2017 |
| JP | 2017-224050 A | | 12/2017 |
| JP | 2018-101420 A | | 6/2018 |

OTHER PUBLICATIONS

International Search Report for PCT Application No. PCT/JP2020/014601, mailed on Aug. 25, 2020.
JP Office Communication for JP Application No. 2022-512912, mailed on Feb. 27, 2024 with English Translation.
U.S. Office Action for U.S. Appl. No. 17/911,176, mailed on Mar. 27, 2025.

* cited by examiner

INFORMATION PROCESSING DEVICE, SYSTEM, METHOD, AND NON-TRANSITORY COMPUTER-READABLE MEDIUM STORING PROGRAM FOR APPLYING A BONUS TO A SETTLEMENT PROCESS

This application is a Continuation of U.S. application Ser. No. 17/911,176 filed on Sep. 13, 2022, which is a National Stage Entry of PCT/JP2020/014601 filed on Mar. 30, 2020, the contents of all of which are incorporated herein by reference, in their entirety.

TECHNICAL FIELD

The present invention relates to information processing devices, systems, methods, and non-transitory computer-readable media storing programs and relates, in particular, to an information processing device, a system, a method, and a non-transitory computer-readable medium storing a program each for applying a bonus to a settlement process.

BACKGROUND ART

Patent Literature 1 discloses a technique related to an information processing system that performs a settlement process by use of facial authentication. Meanwhile, Patent Literature 2 indicates that a facial image used for facial authentication is shared by a plurality of stores.

CITATION LIST

Patent Literature

Patent Literature 1: Japanese Unexamined Patent Application Publication No. 2018-101420
Patent Literature 2: Japanese Unexamined Patent Application Publication No. 2017-068404

SUMMARY OF INVENTION

Technical Problem

There is room for a plurality of stores to share and utilize a history pertaining to facial authentication. The techniques disclosed in Patent Literatures 1 and 2 are not for sharing a history of facial authentication.

The present disclosure has been made to address such an issue and is directed to providing an information processing device, a system, a method, and a program for effectively utilizing a history of facial authentication performed at a plurality of stores.

Solution to Problem

An information processing device according to the present disclosure includes: first authentication controlling means for causing an authentication device to execute first facial authentication or facial registration of a first photographed image capturing a user at a first store; presenting means for presenting recommendation information related to a second store to the user in response to a success of the first facial authentication or in response to the facial registration; second authentication controlling means for causing the authentication device to execute second facial authentication of a second photographed image capturing the user at the second store; and bonus applying means for causing a bonus to be applied to a settlement process of the user at the second store based on a history of the first facial authentication or the facial registration, if the user has been authenticated successfully in the second facial authentication.

An information processing device according to the present disclosure includes: first authenticating means for executing first facial authentication or facial registration of a first photographed image capturing a user at a first store; presenting means for presenting recommendation information related to a second store to the user in response to a success of the first facial authentication or in response to the facial registration; second authenticating means for executing second facial authentication of a second photographed image capturing the user at the second store; and bonus applying means for causing a bonus to be applied to a settlement process of the user at the second store based on a history of the first facial authentication or the facial registration, if the user has been authenticated successfully in the second facial authentication, An information processing system according to the present disclosure includes: an authentication device including authenticating means configured to perform facial authentication; a settlement terminal; and an information processing device, wherein the information processing device is configured to cause the authentication device to execute first facial authentication or facial registration of a first photographed image capturing a user at a first store, present recommendation information related to a second store to the user in response to a success of the first facial authentication or in response to the facial registration, cause the authentication device to perform second facial authentication of a second photographed image capturing the user at the second store, and apply, by use of the settlement terminal, a bonus to a settlement process of the user at the second store based on a history of the first facial authentication or the facial registration, if the user has been authenticated successfully in the second facial authentication.

An information processing method according to the present disclosure is to be executed by a computer and includes: causing an authentication device to execute first facial authentication or facial registration of a first photographed image capturing a user at a first store; presenting recommendation information related to a second store to the user in response to a success of the first facial authentication or in response to the facial registration; causing the authentication device to execute second facial authentication of a second photographed image capturing the user at the second store; and causing a bonus to be applied to a settlement process of the user at the second store based on a history of the first facial authentication or the facial registration, if the user has been authenticated successfully in the second facial authentication.

An information processing method according to the present disclosure is to be executed by a computer and includes: executing first facial authentication or facial registration of a first photographed image capturing a user at a first store; presenting recommendation information related to a second store to the user in response to a success of the first facial authentication or in response to the facial registration; executing second facial authentication of a second photographed image capturing the user at the second store; and causing a bonus to be applied to a settlement process of the user at the second store based on a history of the first facial authentication or the facial registration, if the user has been authenticated successfully in the second facial authentication.

An information processing program according to the present disclosure causes a computer to execute: a process of causing an authentication device to execute first facial authentication or facial registration of a first facial image capturing a user at a first store; a process of presenting recommendation information related to a second store to the user in response to a success of the first facial authentication or in response to the facial registration; a process of causing the authentication device to execute second facial authentication of a second photographed image capturing the user at the second store; and a process of causing a bonus to be applied to a settlement process of the user at the second store based on a history of the first facial authentication or the facial registration, if the user has been authenticated successfully in the second facial authentication.

An information processing program according to the present disclosure causes a computer to execute: a process of executing first facial authentication or facial registration of a first photographed image capturing a user at a first store; a process of presenting recommendation information related to a second store to the user in response to a success of the first facial authentication or in response to the facial registration; a process of executing second facial authentication of a second photographed image capturing the user at the second store; and a process of causing a bonus to be applied to a settlement process of the user at the second store based on a history of the facial authentication, if the user has been authenticated successfully in the second facial authentication.

Advantageous Effects of Invention

The present disclosure can provide an information processing device, a system, a method, and a program for effectively utilizing a history of facial authentication performed at a plurality of stores.

EXAMPLE EMBODIMENT

Figure 1:
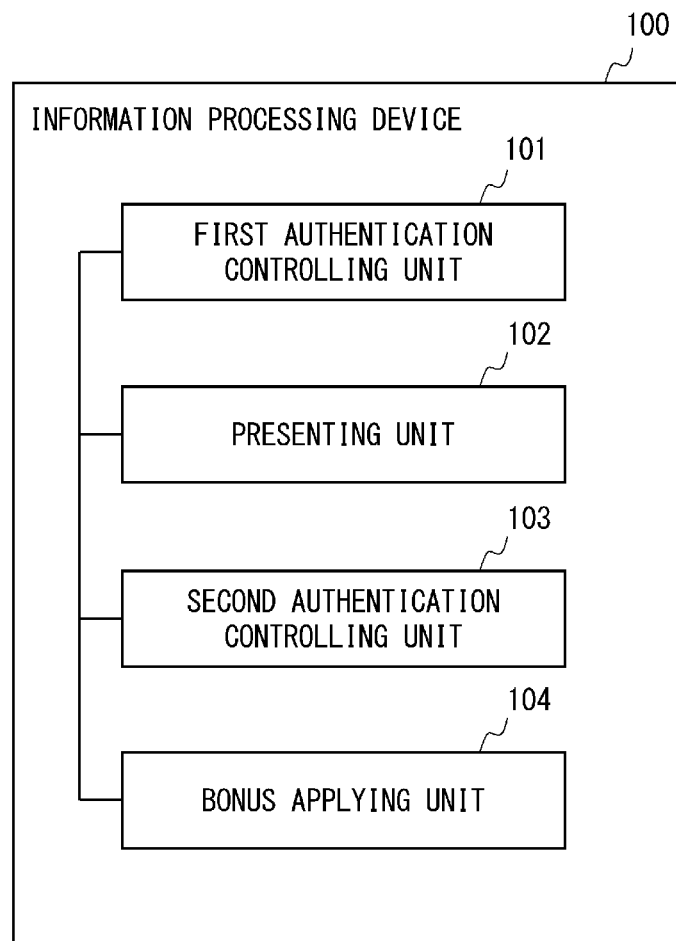
FIG. 1 is a block diagram illustrating a configuration of an information processing device according to a first example embodiment.

Hereinafter, some example embodiments of the present disclosure will be described in detail with reference to the drawings. In the drawings, identical or corresponding elements are given identical reference characters, and duplicate description thereof will be omitted as necessary in order to make the description clearer.

First Example Embodiment

FIG. 1 is a block diagram illustrating a configuration of an information processing device 100 according to a first example embodiment. The information processing device 100 includes a first authentication controlling unit 101, a presenting unit 102, a second authentication controlling unit 103, and a bonus applying unit 104. The information processing device 100 is connected to a network 500 (not illustrated). The network 500 may be a wired network or a wireless network.

An authentication device 200 (not illustrated) is connected to the network 500. The authentication device 200 performs facial authentication by use of facial feature information extracted from a facial image. The authentication device 200 may register facial feature information to be used for facial authentication (may perform facial registration).

The first authentication controlling unit 101 causes the authentication device 200 to perform first facial authentication or facial registration of a first photographed image capturing a user photographed at a first store. The presenting unit 102 presents recommendation information related to a second store in response to the facial registration or the success of the first facial authentication in the first authentication controlling unit 101. The presenting unit 102 may output the recommendation information to a display unit of a settlement terminal installed at the first store or to a user terminal owned by the user. The recommendation information may be bonus information related to a bonus to be applied to a settlement at the second store or advertisement information introducing the second store. The recommendation information may be information that is based on an attribute (age, gender, etc.) of the user.

The second authentication controlling unit 103 causes the authentication device 200 to execute second facial authentication of a second photographed image capturing the user at the second store. The bonus applying unit 104 causes a bonus to be applied to a settlement process of the user at the second store based on a history of first facial authentication or facial registration, if the user has been authenticated successfully in the second facial authentication. Recorded in the history is, for example, the user ID (identifier) of the user authenticated successfully in the first facial authentication. The history may be a history of a settlement process or settlement processes performed in response to the success of first facial authentication.

The bonus applying unit 104 may cause a predetermined bonus to be applied, for example, if the user ID of the user authenticated successfully in the second facial authentication is included in the history. In a case where the history includes information pertaining to the time of a visit, the bonus applying unit 104 may cause a bonus to be applied if the user has visited the first store in a predetermined period. The bonus applying unit 104 may cause a bonus to be applied that is based on the monetary amount of a settlement process performed in response to the success of first facial authentication.

Figure 2:
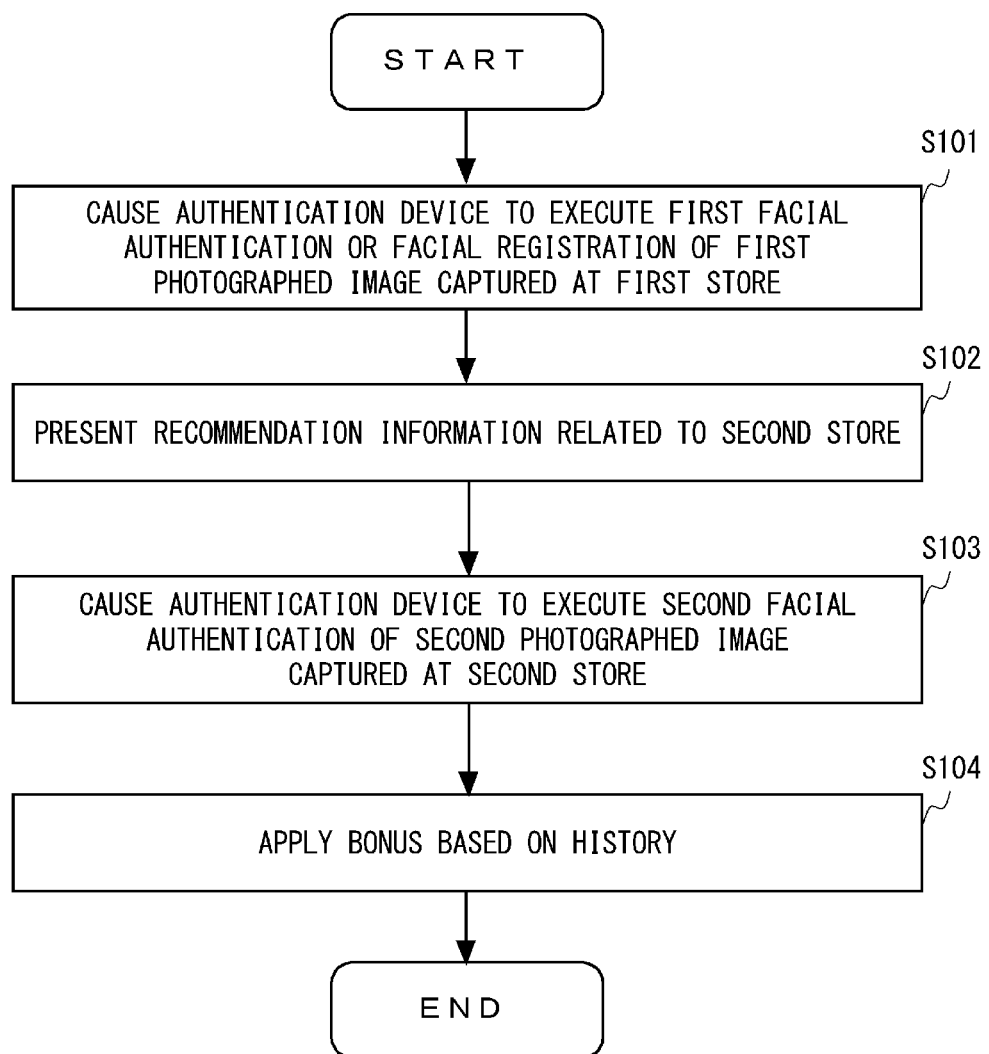
FIG. 2 is a flowchart illustrating a flow of an information processing method according to the first example embodiment.

FIG. 2 is a flowchart illustrating a flow of an information processing method according to the first example embodiment. First, the first authentication controlling unit 101 causes the authentication device 200 to execute first facial authentication or facial registration of a first photographed image capturing a user at a first store (step S101). The first photographed image includes at least a facial region of the user. Next, the presenting unit 102 presents, to the user, recommendation information related to a second store (step S102).

Next, the second authentication controlling unit 103 causes the authentication device 200 to perform second facial authentication of a second photographed image capturing the user at the second store (step S103). Lastly, the bonus applying unit 104 causes a bonus that is based on a history of first facial authentication or facial registration performed at step S101 to be applied to a settlement process of the user at the second store (step S104).

As stated above, a history of facial authentication performed at a plurality of stores has not been shared for utilization previously. In contrast, the present example embodiment makes it possible to apply a bonus to a settlement process at a second store based on a history of facial authentication performed at a first store.

Herein, the information processing device 100 includes, as its components, a processor, a memory, and a storage device (none illustrated). The storage device stores a computer program that implements the processes of the information processing method according to the present example embodiment.

The processor loads the computer program from the storage device onto the memory and executes the computer program. Thus, the processor implements the functions of the first authentication controlling unit 101, the presenting unit 102, the second authentication controlling unit 103, and the bonus applying unit 104.

Alternatively, the first authentication controlling unit 101, the presenting unit 102, the second authentication controlling unit 103, and the bonus applying unit 104 may each be implemented by a dedicated piece of hardware. A part or the whole of the constituent elements of each device may be implemented by, for example, general-purpose or dedicated circuitry, a processor, or a combination thereof. Such constituent elements may be formed by a single chip or by a plurality of chips connected via a bus. A part or the whole of the constituent elements of each device may be implemented by a combination of the above-described circuitry or the like and a program. For the processor, a central processing unit (CPU), a graphics processing unit (GPU), a field-programmable gate array (FPGA), or the like can be used.

In a case where a part or the whole of the constituent elements of the information processing device 100 is implemented by a plurality of information processing devices, circuitries, or the like, these information processing devices, circuitries, or the like may be disposed centrally or distributedly. For example, these information processing devices, circuitries, or the like may be implemented in a mode in which they are connected to each other via a communication network, as in, for example, a client server system or a cloud computing system. The function of the information processing device 100 may be provided in a Software as a Service (SaaS) format.

Second Example Embodiment

A second example embodiment is a modification example of the first example embodiment described above. The information processing device 100 according to the first example embodiment performs individual authentication by the external authentication device 200. In contrast, an information processing device 100 according to the second example embodiment performs individual authentication within the device. The information processing device 100, for example, includes a storage unit that stores facial feature information of a plurality of persons and performs facial authentication by use of the facial feature information of the plurality of persons.

Figure 3:
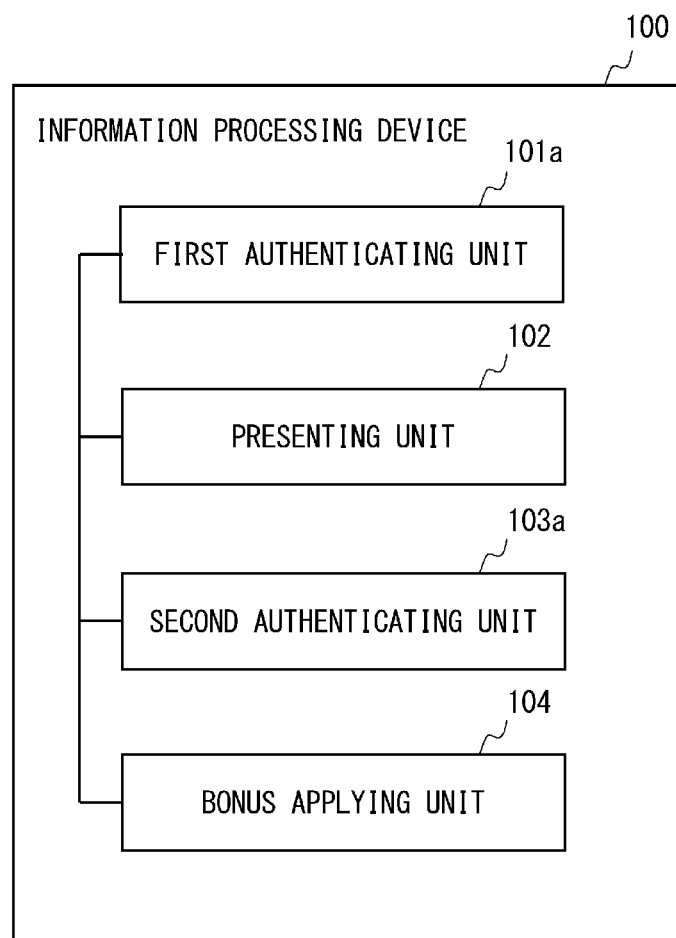
FIG. 3 is a block diagram illustrating a configuration of an information processing device according to a second example embodiment.

FIG. 3 is a block diagram illustrating a configuration of the information processing device 100 according to the second example embodiment. The information processing device 100 includes a first authenticating unit 101*a*, a presenting unit 102, a second authenticating unit 103*a*, and a bonus applying unit 104. The functions of the presenting unit 102 and the bonus applying unit 104 are similar to those according to the first example embodiment, and thus description thereof will be omitted.

The first authenticating unit 101*a* according to the second example embodiment performs first facial authentication or facial registration of a first photographed image of a user captured at a first store. The second authenticating unit 103*a* according to the second example embodiment performs second facial authentication of a second photographed image capturing the user at a second store.

A flow of an information processing method according to the second example embodiment is similar to the flow illustrated in FIG. 2. However, at step S101, the first authenticating unit 101*a* performs first facial authentication or facial registration of a first photographed image. Then, at step S103, the second authenticating unit 103*a* performs second facial authentication of a second photographed image.

In this manner, the second example embodiment too can provide advantageous effects similar to those provided by the first example embodiment described above.

Third Example Embodiment

Figure 4:
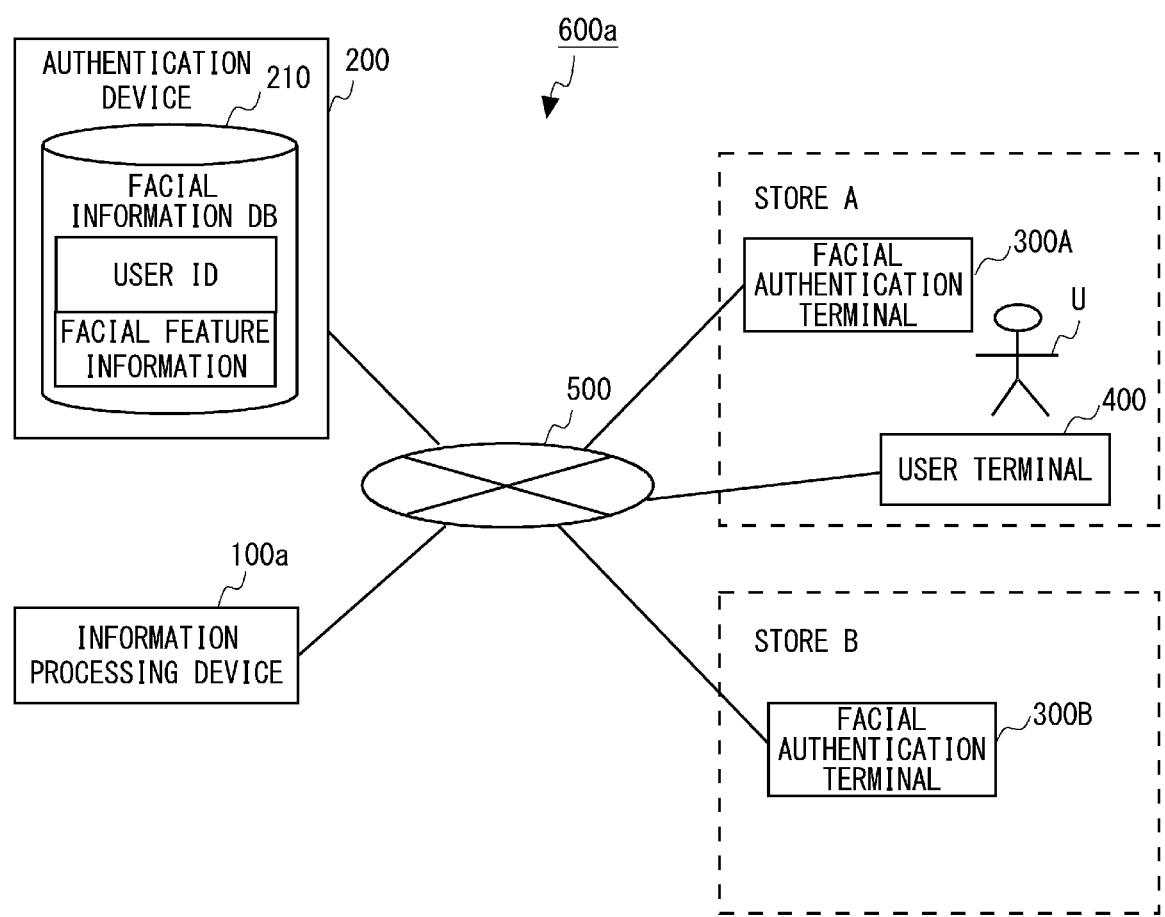
FIG. 4 is a block diagram illustrating a configuration of an information processing system according to a third example embodiment.

A third example embodiment is a specific example of the first example embodiment described above. According to the third example embodiment, a user undergoes first facial authentication at a first store and second facial authentication at a second store. FIG. 4 is a block diagram illustrating a configuration of an information processing system 600*a* according to the third example embodiment. The information processing system 600*a* includes an information processing device 100*a*, an authentication device 200, a facial authentication terminal 300A, a facial authentication terminal 300B, and a user terminal 400. The information processing device 100*a*, the authentication device 200, the facial authentication terminal 300A, the facial authentication terminal 300B, and the user terminal 400 are connected to each other via a network 500. According to the third example embodiment, facial feature information of a plurality of users are registered in advance in the authentication device 200.

The information processing device 100a applies a bonus to a settlement process of a user U at a store B based on a history of facial authentication at a store A. In other words, the store A is a first store, and the store B is a second store. Herein, there may be a plurality of first stores as well as a plurality of second stores. A bonus that is based on a history of facial authentication at a store B may be applied to a settlement process at a store A.

A history of facial authentication may be a history of a settlement process or settlement processes performed in response to the success of first facial authentication. In other words, the information processing device 100a may cause a bonus corresponding to the monetary amount of a settlement of the user U at a store A to be applied to a settlement process of the user U at a store B. Each function of the information processing device 100a will be described later.

The authentication device 200 includes a facial information DB 210. The facial information DB 210 stores mapping between a user ID and facial feature information of this user. The facial information DB 210 is also referred to as a storage unit. The authentication device 200, in response to receiving a facial authentication request from the outside, compares a facial image or facial feature information included in the received request against the facial feature information of the user and returns the result of the comparison to the requestor.

A facial authentication terminal 300 is a terminal device that performs facial authentication at each store. A facial authentication terminal 300 installed at the store A is referred to as a facial authentication terminal 300A. A facial authentication terminal 300 installed at the store B is referred to as a facial authentication terminal 300B. The facial authentication terminal 300A displays, on a display device, recommendation information of the store B. Herein, the information processing system 600a may display the recommendation information of the store B on the user terminal 400. The facial authentication terminal 300B performs a settlement process after facial authentication at the store B. In other words, the facial authentication terminal 300B is a settlement terminal installed at the store B. Herein, the facial authentication terminal 300A does not have to be a settlement terminal.

The user terminal 400 is a terminal owned by the user U. The user terminal 400 is, for example but not limited to, a mobile phone terminal, a smartphone, a tablet terminal, or a personal computer (PC) equipped with or connected to a camera. The user terminal 400 transmits, to the authentication device 200, a registration image to be used for facial authentication of the user U and makes a facial information registration request. Herein, the user terminal 400 may transmit facial feature information extracted from the registration image to the authentication device 200 and make a facial information registration request. The user terminal 400 may receive recommendation information related to the store B from the information processing device 100a.

Specifically, the user terminal 400 is a device that, before facial authentication is performed, registers facial feature information extracted from a facial image of the user U into the facial information DB 210. Herein, the user U may register facial feature information by use of a device other than the user terminal 400. The user U may register facial feature information by use of, for example, a facial authentication terminal equipped with a function of making a facial information registration request described above.

Figure 5:
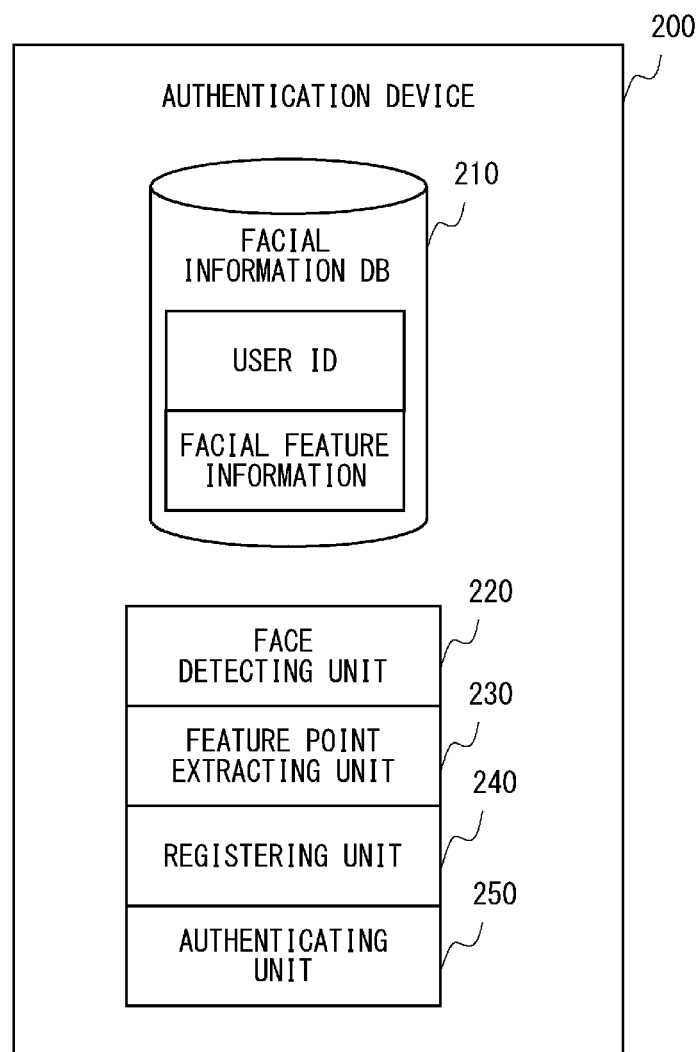
FIG. 5 is a block diagram illustrating a configuration of an authentication device according to the third example embodiment.

Next, some functions of the authentication device 200 will be described in detail. FIG. 5 is a block diagram illustrating a configuration of the authentication device 200. The authentication device 200 includes the facial information DB 210 described earlier, a face detecting unit 220, a feature point extracting unit 230, a registering unit 240, and an authenticating unit 250.

The face detecting unit 220 detects a facial region included in a registration image for registering facial information and outputs the detected facial region to the feature point extracting unit 230. The feature point extracting unit 230 extracts feature points from the facial region detected by the face detecting unit 220 and outputs facial feature information to the registering unit 240. In this example, the facial feature information is a set of extracted feature points. The feature point extracting unit 230 also extracts feature points included in a facial image received from the information processing device 100a and outputs facial feature information to the authenticating unit 250.

The registering unit 240 issues a new user ID when registering facial feature information. The registering unit 240 registers mapping between the issued user ID and the facial feature information extracted from the registration image into the facial information DB 210. The authenticating unit 250 compares the facial feature information extracted from the facial image against the facial feature information in the facial information DB 210. The authenticating unit 250 returns, to the information processing device 100a, the presence or absence of a match between the two pieces of facial feature information. The presence or absence of a match between the two pieces of facial feature information corresponds to the success or failure of the authentication.

Figure 6:
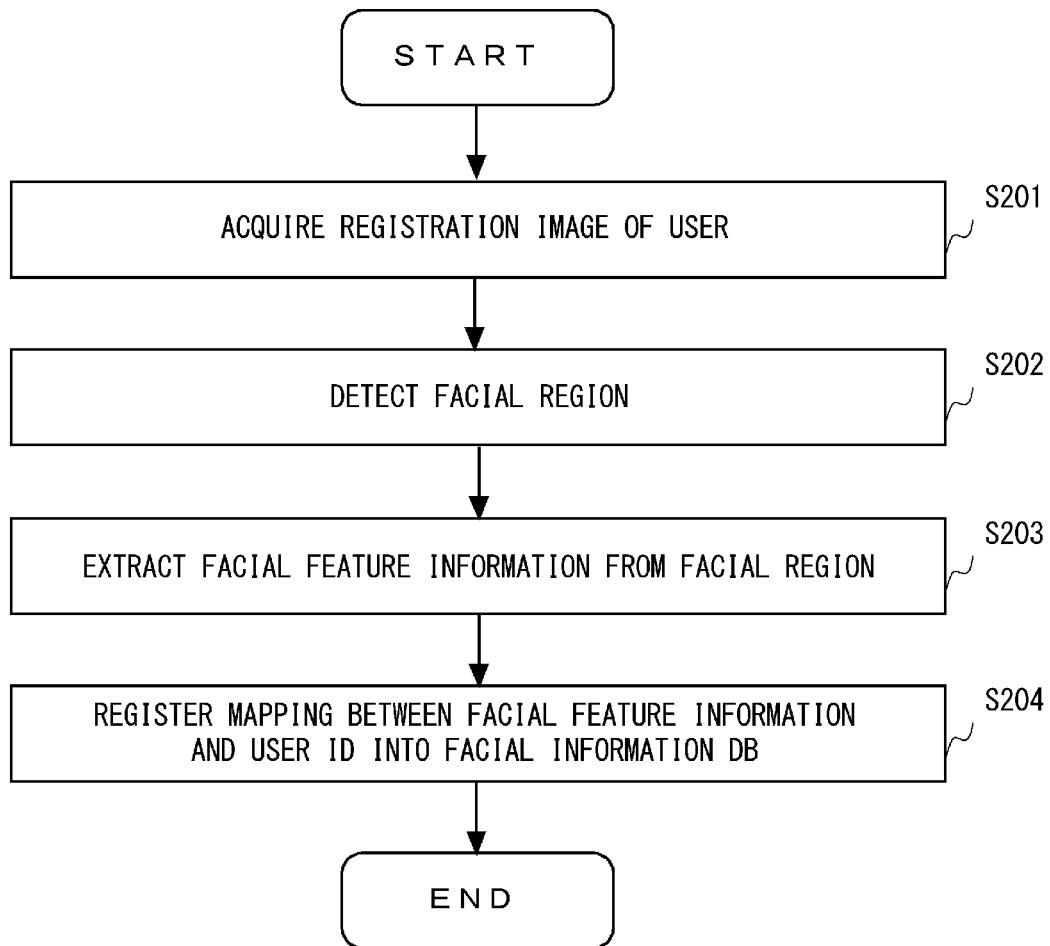
FIG. 6 is a flowchart illustrating a flow of a facial information registration process according to the third example embodiment.

FIG. 6 is a flowchart illustrating a flow of a facial information registration process performed by the authentication device 200. First, the authentication device 200 acquires a registration image included in a facial information registration request (step S201). For example, the authentication device 200 receives the facial information registration request from the user terminal 400 or the like via the network 500. Next, the face detecting unit 220 detects a facial region included in the registration image (step S202). Next, the feature point extracting unit 230 extracts feature points from the facial region detected at step S202 and outputs facial feature information to the registering unit 240 (step S203). Lastly, the registering unit 240 issues a user ID and registers mapping between this user ID and the facial feature information into the facial information DB 210 (step S204). Herein, the authentication device 200 may receive the facial feature information from the user terminal 400 or the like and register mapping between the facial feature information and the user ID into the facial information DB 210.

Figure 7:
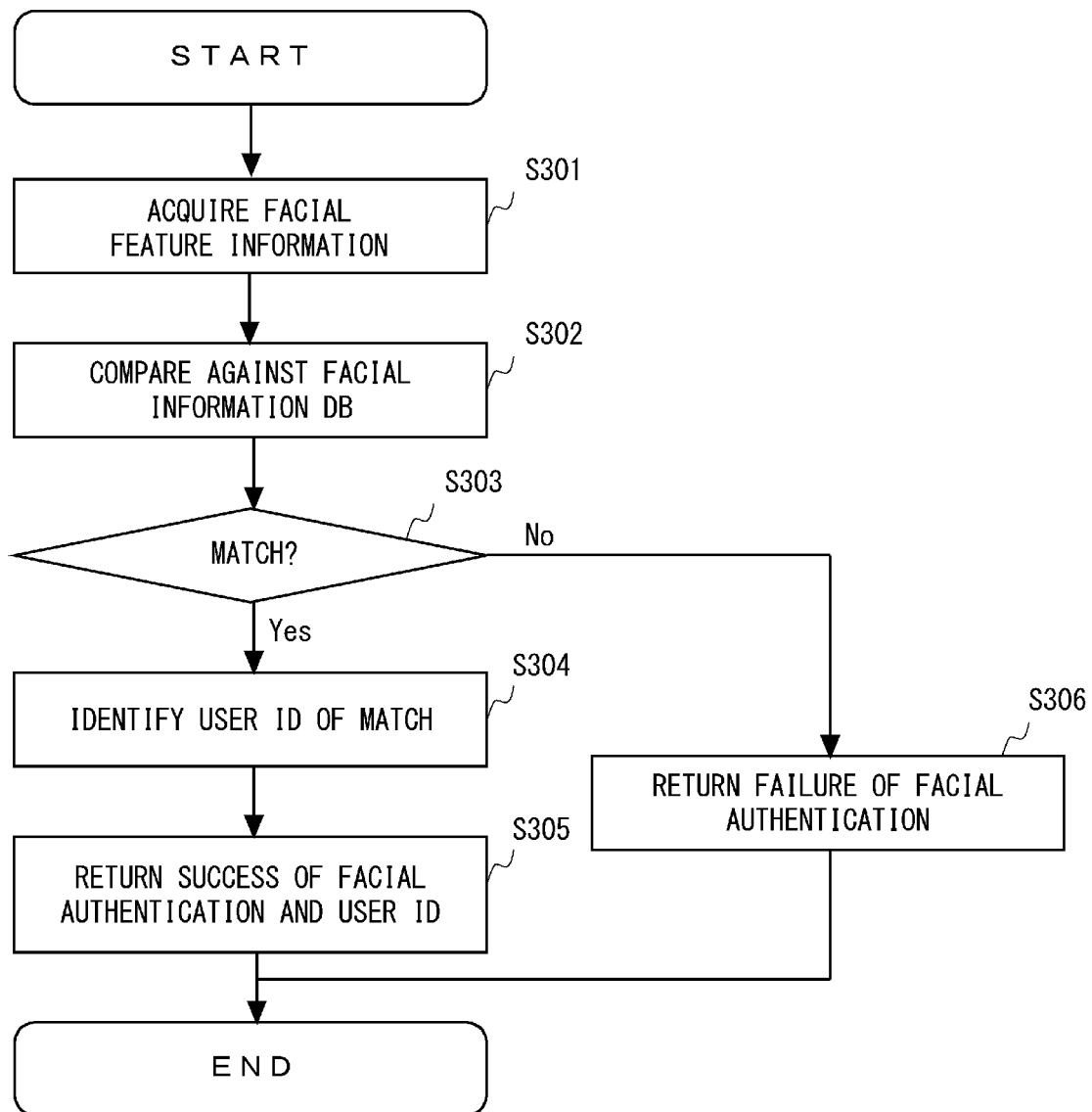
FIG. 7 is a flowchart illustrating a flow of a facial authentication process according to the third example embodiment.

FIG. 7 is a flowchart illustrating a flow of a facial authentication process performed by the authentication device 200. First, the feature point extracting unit 230 acquires facial feature information from a facial image received from the information processing device 100a (step S301). For example, the authentication device 200 receives a facial image from the information processing device 100a and extracts facial feature information as in step S201 to step S203. Alternatively, the authentication device 200 may receive facial feature information from the information processing device 100a. Next, the authenticating unit 250 compares the acquired facial feature information against the facial information DB 210 (step S302). If the facial feature information has a match (Yes at step S303), the authenticating unit 250 identifies the user ID of the user that the facial feature information has matched with (step S304) and returns the success of the facial authentication and the identified user ID to the information processing device 100a (step S305). If the facial feature information has no match (No at step S303), the authenticating unit 250 returns the failure of the facial authentication to the information processing device 100a (step S306).

Figure 8:
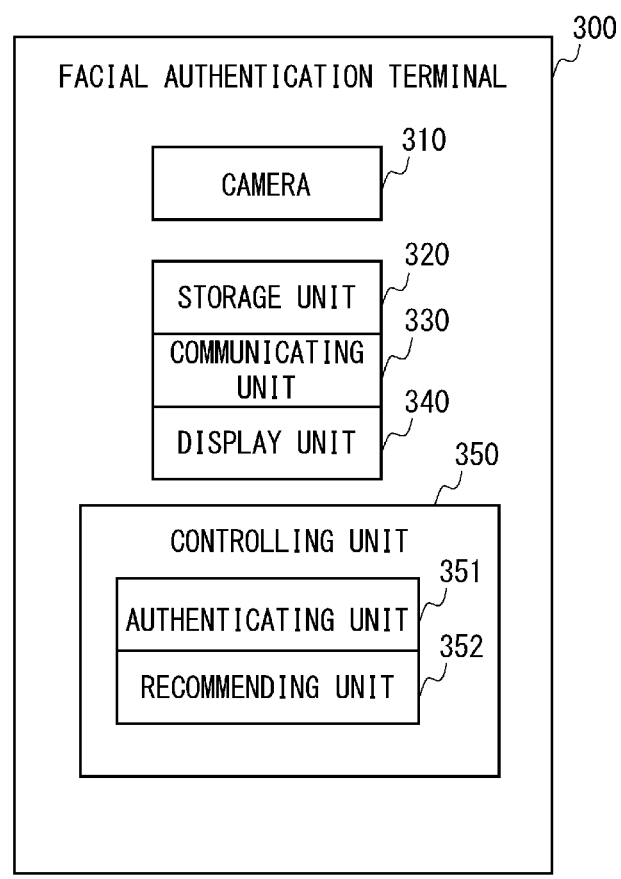
FIG. 8 is a block diagram illustrating a configuration of a facial authentication terminal according to the third example embodiment.

Next, a facial authentication terminal 300 will be described in detail. The facial authentication terminal 300 includes, as its hardware components, a photographing device such as a camera, a display device, and a computer. FIG. 8 is a block diagram illustrating a configuration of the facial authentication terminal 300.

The facial authentication terminal 300 includes a camera 310 as mentioned above, a storage unit 320, a communicating unit 330, a display unit 340, and a controlling unit 350. The storage unit 320 is a storage device that stores a program for implementing each function of the facial authentication terminal 300. The communicating unit 330 is a communication interface with the network 500. The display unit 340 is the display device mentioned above. The controlling unit 350 controls hardware components of the facial authentication terminal 300. The controlling unit 350 includes an authenticating unit 351 and a recommending unit 352.

The authenticating unit 351 photographs a user to be subjected to facial authentication by controlling the camera 310, transmits the captured photographed image to the information processing device 100a, and causes the information processing device 100a to perform facial authentication. The photographed image is an image that includes at least a facial image of the user. After transmitting the photographed image of the user, the authenticating unit 351 of the facial authentication terminal 300 performs a settlement in accordance with a settlement instruction from the information processing device 100a. Herein, the authenticating unit 351 of the facial authentication terminal 300A does not have to have the function of performing a settlement.

The recommending unit 352 displays recommendation information in accordance with an instruction from the information processing device 100a. The recommending unit 352 of the facial authentication terminal 300A displays, for example, recommendation information related to the store B. The recommendation information may be information on a coupon to be applied to a settlement process at the store B or may simply be an advertisement introducing the store B. Herein, the facial authentication terminal 300B does not have to have the function of displaying recommendation information.

Figure 9:
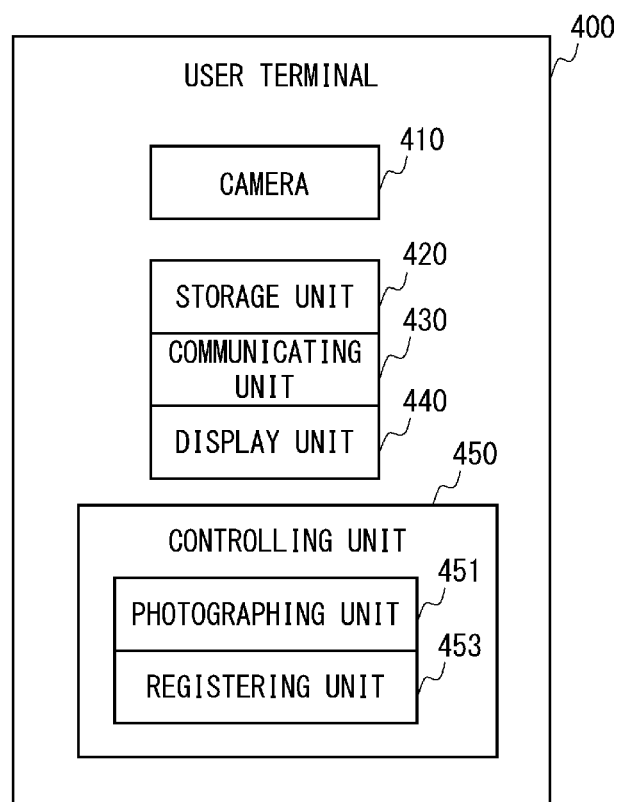
FIG. 9 is a block diagram illustrating a configuration of a user terminal according to the third example embodiment.

Next, the user terminal 400 will be described. The user terminal 400 is, for example, a mobile phone terminal owned by the user. FIG. 9 is a block diagram illustrating a configuration of the user terminal 400. The user terminal 400 includes a camera 410, a storage unit 420, a communicating unit 430, and a display unit 440. The user terminal 400 further includes a controlling unit 450 that controls the aforementioned hardware components. The controlling unit 450 includes a photographing unit 451 and a registering unit 453.

The user terminal 400 has a function of making a facial information registration request. A flow of a facial information registration process will be described below. The photographing unit 451 first controls the camera 410 to obtain a registration image of the user. Next, the registering unit 453 transmits a facial information registration request including the registration image to the authentication device 200 via the network 500. The registering unit 453 may receive the registered user ID as a registration result. Herein, the registering unit 453 may transmit, to the authentication device 200, a facial information registration request including facial feature information extracted from the registration image.

The user terminal 400 may further include a recommending unit 452 (not illustrated). As with the recommending unit 352 of the facial authentication terminal 300, the recommending unit 452 receives recommendation information from the information processing device 100a and displays the recommendation information on the display unit 440. Herein, in a case where the facial authentication terminal 300A displays recommendation information, the user terminal 400 does not have to include the recommending unit 452.

Figure 10:
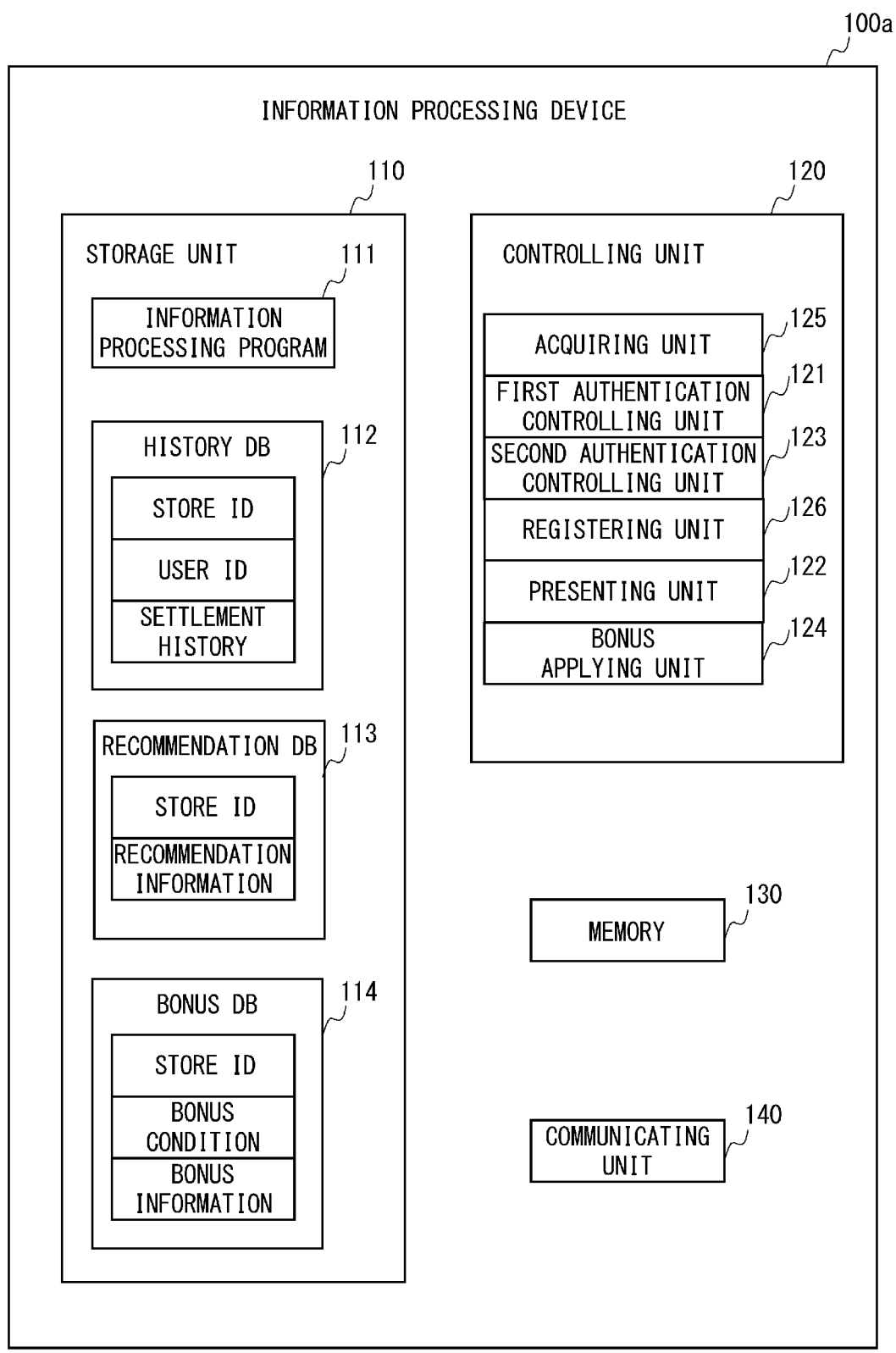
FIG. 10 is a block diagram illustrating a configuration of an information processing device according to the third example embodiment.

Next, some functions of the information processing device 100a will be described with reference to FIG. 10. The information processing device 100a is an information processing device that determines a bonus to be applied to a settlement process performed at a second store, based on a history of facial authentication performed at a first store and is, for example, a server device implemented by a computer. As illustrated in FIG. 10, the information processing device 100a includes a storage unit 110, a controlling unit 120, a memory 130, and a communicating unit 140.

The storage unit 110 is a storage device, such as a hard disk or a flash memory. The controlling unit 120 controls each function of the information processing device 100a. The memory 130 is a volatile storage device, such as a random-access memory (RAM), and is a storage area for temporarily holding information while the controlling unit 120 operates. The communicating unit 140 is a communication interface with the network 500.

The storage unit 110 stores at least an information processing program 111, a history DB 112, a recommendation DB 113, and a bonus DB 114. The information processing program 111 is a computer program equipped with the information processing method according to the present example embodiment.

The history DB 112 stores a history of facial authentication of users. In other words, the history DB 112 stores mapping between a store ID and the user ID of a user who has visited the store. The history of facial authentication may be a history of a settlement process or settlement processes performed in response to the success of facial authentication. In this case, the history DB 112 stores mapping between a store ID, a user ID, and a settlement history, as illustrated in FIG. 10. Moreover, the history DB 112 may store mapping between the user ID of a user who has visited the store A and a coupon issued to the user. A bonus applying unit 124, described later, determines a bonus that is based on the history DB 112.

The recommendation DB 113 stores an association between recommendation information and a store ID. The recommendation DB 113 is a database that a presenting unit 122, described later, refers to when outputting recommendation information. The recommendation information to be associated with the store ID of the store A may be, for example, an advertisement related to the store B or a coupon to be applied to a settlement at the store B.

The bonus DB 114 stores, for example, an association between a bonus condition, bonus information, and a store ID. The bonus DB 114 is a database that the bonus applying unit 124, described later, refers to when determining a bonus. The bonus condition is a condition based on which a bonus is applied to a settlement. For example, a bonus condition of the store B may be that facial authentication has been performed at the store A or that a settlement of a predetermined monetary amount or more has been made at the store A. In this example, if the predetermined monetary amount is 0 yen, a bonus is applied in accordance with whether a purchase has been made at the first store.

The bonus information is information indicating the contents of a bonus to be applied and is, for example, information indicating that the monetary amount to be settled is discounted by 10%. The discount may be determined in accordance with the monetary amount settled at the first store. For example, the amount of discount may be in proportion to the monetary amount of a settlement process at the first store.

The controlling unit 120 loads the information processing program 111 from the storage unit 110 onto the memory 130 and executes the information processing program 111. Thus, the controlling unit 120 implements the functions of an acquiring unit 125, a first authentication controlling unit 121, a second authentication controlling unit 123, a registering unit 126, a presenting unit 122, and a bonus applying unit 124. Herein, the first authentication controlling unit 121 is an example of the first authentication controlling unit 101, the second authentication controlling unit 123 is an example of the second authentication controlling unit 103, the presenting unit 122 is an example of the presenting unit 102, and the bonus applying unit 124 is an example of the bonus applying unit 104.

The acquiring unit 125 acquires, from each store, a photographed image captured by a facial authentication terminal 300. The first authentication controlling unit 121 causes the authentication device 200 to execute facial authentication of a first photographed image captured at a first store and acquired by the acquiring unit 125. The second authentication controlling unit 123 causes the authentication device 200 to execute facial authentication of a second photographed image captured at a second store and acquired by the acquiring unit 125. The registering unit 126 registers, into the history DB 112, the user ID of the user authenticated successfully in facial authentication at the first store. The registering unit 126 may register an association between a settlement history (e.g., a settlement record) received from a facial authentication terminal 300 and the user ID into the history DB 112. Moreover, the registering unit 126 may register mapping between the user ID of the user who has visited the first store and a coupon issued to the user into the history DB 112. The coupon to be registered may be a coupon corresponding to the recommendation information presented by the presenting unit 122.

The presenting unit 122 outputs recommendation information to the facial authentication terminal 300A in response to the success of facial authentication at the store A. The presenting unit 122 may output the recommendation information to the facial authentication terminal 300A after receiving the result of facial authentication from the authentication device 200. In a case where the facial authentication terminal 300A is a settlement terminal, the presenting unit 122 may output the recommendation information after receiving a settlement history (e.g., a settlement record) from the facial authentication terminal 300A. The presenting unit 122 may display, for example, a message stating "10% OFF BOXED TISSUES AT STORE B!" on the facial authentication terminal 300A. In addition, the presenting unit 122 may display a condition based on which a bonus is applied to a settlement process on the facial authentication terminal 300A or the like. The presenting unit 122 may display, for example, the monetary amount that needs to be settled at the store B for receiving a bonus or a period in which a bonus can be applied at the store B on the facial authentication terminal 300A or the like.

The presenting unit 122 may display the recommendation information on the user terminal 400, instead of the facial authentication terminal 300A. In this example, the presenting unit 122 may output the recommendation information to the user terminal 400 based on the user ID included in the settlement history (e.g., a settlement record) received from the facial authentication terminal 300 or included in the result of authentication received from the authentication device 200. An assumption in this example is that the user is logged in to the user terminal 400 with his or her user ID.

The bonus applying unit 124 determines a bonus to be applied to a settlement process at the store B based on the bonus DB 114 and causes the facial authentication terminal 300B to perform a settlement process to which the bonus is applied. An example of a flow of a process in which the bonus applying unit 124 determines a bonus will be described below. First, the bonus applying unit 124 acquires the user ID of a user subjected to facial authentication at the store B from the second authentication controlling unit 123. Next, the bonus applying unit 124 determines whether this user satisfies a bonus condition in the bonus DB 114 based on the history DB 112. If the bonus condition is satisfied, the bonus applying unit 124 determines corresponding bonus information as a bonus. If there is a coupon mapped to this user in the history DB 112, the bonus applying unit 124 may determine this coupon as a bonus.

Herein, the bonus applying unit 124 may apply a bonus with the monetary amount to be settled at the store B taken into consideration. For example, the bonus applying unit 124 may apply a bonus if the monetary amount to be settled at the store B is no less than a predetermined amount or apply, as a bonus, a discount based on the monetary amount to be settled at the store B. The monetary amount to be settled at the store B can be rephrased as an anticipated monetary amount to be settled. When a bonus has been applied to a settlement process at the second store, the anticipated monetary amount to be settled can differ from the actual monetary amount to be settled.

The bonus applying unit 124 may determine whether to apply a bonus based on the period of time during which facial authentication has been performed at the first store. In a case where the history DB 112 stores an association between a user ID and an authentication time, the bonus applying unit 124 can make the aforementioned determination based on the history DB 112. Herein, the authentication time may be recorded in units of seconds or may record the date of authentication.

The bonus applying unit 124 applies a bonus to a settlement process at the second store if, for example, the user visits the second store within one week of his or her visit to the first store. In this case, the bonus applying unit 124, for example, performs a process of obtaining a difference between the current time and the authentication time recorded in the history DB 112. Then, the bonus applying unit 124 determines whether this difference satisfies a bonus condition related to the period.

Furthermore, the bonus applying unit 124 may apply a bonus to merchandise included in the recommendation information presented at the first store. If the registering unit 126 registers a merchandise ID of an item of merchandise included in the recommendation information into the history DB 112, the bonus applying unit 124 can apply a bonus to a recommended item of merchandise based on the history DB 112.

For example, the presenting unit 122 presents recommendation information indicating apples as advertised merchandise to the user U at the first store. In this case, the bonus applying unit 124 applies a bonus when the user U purchases an apple at the second store. The bonus applying unit 124 may apply a bigger bonus when the user U purchases an apple at the second store than when the user U purchases merchandise other than apples.

Herein, the bonus applying unit 124 may apply a plurality of bonuses to a single settlement process at the second store. For example, the bonus applying unit 124 may apply, to a settlement process, both a bonus from the fact that facial authentication was performed at the first store and a bonus from the fact that a predetermined amount or more is to be settled at the second store. For example, in a case where a store ID is mapped to a plurality of bonus conditions and a plurality of pieces of bonus information in the bonus DB 114, the bonus applying unit 124 can apply a plurality of bonuses to a settlement process.

Figure 11:
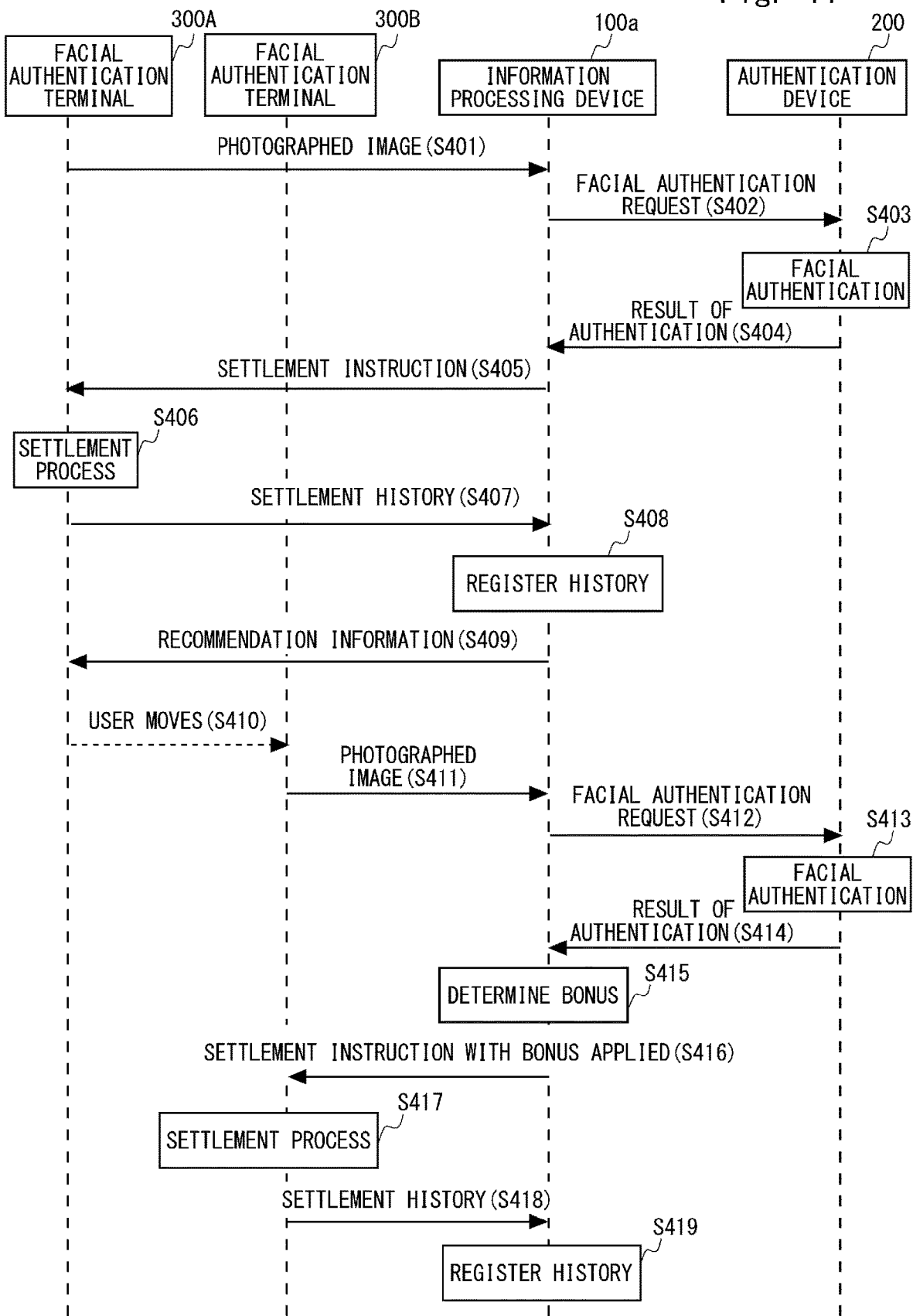
FIG. 11 is a sequence diagram illustrating a flow of an information processing method according to the third example embodiment.

FIG. 11 is a sequence diagram illustrating an example of an operation of the information processing system 600a according to the present example embodiment. First, the acquiring unit 125 of the information processing device 100a acquires, from the facial authentication terminal 300A, a photographed image of a user U who is to settle with facial authentication at the store A (step S401). Next, the first authentication controlling unit 121 of the information processing device 100a transmits a facial authentication request to the authentication device 200 and causes the authentication device 200 to perform facial authentication (step S402). Next, the authentication device 200 performs facial authentication (step S403) and transmits, to the information processing device 100a, the success of the authentication and the user ID of the user U authenticated successfully as the result of the authentication (step S404).

Next, the facial authentication terminal 300A, in response to a settlement instruction from the information processing device 100a (step S405), performs a settlement process of the user U (step S406). Then, the registering unit 126 of the information processing device 100a acquires a settlement history (e.g., a settlement record) from the facial authentication terminal 300A (step S407) and registers the settlement history (e.g., a settlement record) into the history DB 112 (step S408).

Herein, if the facial authentication terminal 300A does not perform a settlement process, the processes at step S405 to step S407 are not necessary. In this case, the registering unit 126 registers the result of the authentication received at step S404 into the history DB 112. In addition, the registering unit 126 may register, into the history DB 112, mapping between a coupon corresponding to recommendation information to be presented at step S409 and the user ID.

Next, the presenting unit 122 of the information processing device 100a displays recommendation information related to the store B on the display unit 340 of the facial authentication terminal 300A (step S409). The recommendation information may be an advertisement of the store B or a notification concerning a discount at the store B. The presenting unit 122 of the information processing device 100a may also output the recommendation information to the user terminal 400. Herein, the process at step S409 may be executed before step S408.

The user U presented with the recommendation information of the store B moves from the store A to the store B at step S410. The acquiring unit 125 of the information processing device 100a acquires, from the facial authentication terminal 300B, a photographed image of the user U who is to settle with facial authentication at the store B (step S411). Next, the second authentication controlling unit 123 of the information processing device 100a causes the authentication device 200 to perform facial authentication (step S412). Next, the authentication device 200 performs second facial authentication (step S413) and transmits the success of the authentication and the user ID of the user U as the result of the authentication to the second authentication controlling unit 123 of the information processing device 100a (step S414).

Next, the bonus applying unit 124 determines a bonus to be applied to the settlement of the user U (step S415). For example, the bonus applying unit 124 determines whether a bonus condition at the store B in the bonus DB 114 is satisfied based on the settlement history in the history DB 112. Then, if the bonus condition is satisfied, the bonus applying unit 124 determines bonus information associated with the bonus condition as a bonus. Herein, the bonus applying unit 124 may receive information pertaining to the settlement process from the facial authentication terminal 300B and determine a bonus based on the monetary amount to be settled at the store B.

The determined bonus may be applied to the settlement process automatically or in accordance with the result of the user confirming the bonus. In a case where the user's intention is to be confirmed, the bonus applying unit 124 displays a confirmation screen for confirming whether the user is to use the bonus on the facial authentication terminal 300B or the user terminal 400. The confirmation screen includes, for example, a USE button that receives an operation indicating that the user is to use the bonus and a DO NOT USE button that receives an operation indicating that the user is not to use the bonus. The confirmation screen may include an overview of the bonus determined at step S415.

The bonus applying unit 124 may determine to apply the bonus if the user has indicated his or her intention concerning the use of the bonus. For example, the bonus applying unit 124 may determine to apply the bonus if the user has pressed the USE button. The bonus applying unit 124 may determine to apply the bonus if the user has refrained from indicating his or her intention concerning the use of the bonus. For example, the bonus applying unit 124 may determine to apply the bonus if the user does not press the DO NOT USE button within a predetermined time. The predetermined time is, for example, five seconds. In this manner, a bonus may be applied automatically or in accordance with the user's selection as to whether to use the bonus.

Next, the bonus applying unit 124 transmits a settlement instruction for applying the bonus determined at step S415 to the facial authentication terminal 300B (step S416). The facial authentication terminal 300B performs a settlement process based on the settlement instruction (step S417) and transmits the settlement history (e.g., a settlement record) to the registering unit 126 of the information processing device 100a (step S418).

In this example, the bonus applying unit 124 may display the contents of the bonus, a reason for applying the bonus, or the like on the screen for the settlement process displayed by the facial authentication terminal 300B. For example, the bonus applying unit 124 displays, as a reason for applying the bonus, that the user has undergone facial authentication at the store A and visited the store B.

Lastly, the registering unit 126 registers the received settlement history (e.g., a settlement record) into the history DB 112 (step S419). The registering unit 126 may register, instead of the settlement history (e.g., a settlement record), the result of authentication received at the step S414 into the history DB 112. Herein, in a case where a history of facial authentication at the store B is not used in application of a bonus, the registering unit 126 does not have to perform the process at step S419.

The information processing device 100a according to the present example embodiment can apply a bonus to a settlement process of a user presented with recommendation information by use of facial authentication. The user does not need to carry around paper coupons, an electronic device recording coupon information, or the like. Moreover, the information processing device 100a eliminates the likelihood that a coupon is used by a person other than the user to whom the coupon was issued.

Fourth Example Embodiment

The information processing device 100a according to the third example embodiment causes facial authentication to be performed of a first photographed image capturing a user at a store A. Meanwhile, an information processing device 100a according to a fourth example embodiment causes facial registration to be performed of a first photographed image capturing a user at a store A. An information processing system 600a according to the fourth example embodiment has a configuration similar to the configuration illustrated in FIG. 4. A facial authentication terminal 300A is, for example, a digital signage installed at a store A.

The information processing device 100a according to the fourth example embodiment has a configuration similar to the configuration illustrated in FIG. 10. However, a first authentication controlling unit 121 causes an authentication device 200 to execute facial registration of a photographed image capturing a user and acquired from the facial authentication terminal 300A. Then, the first authentication controlling unit 121 receives the user ID of the registered user as the result of facial registration from the authentication device 200.

A registering unit 126 registers the user ID received from the authentication device 200 into a history DB 112. A presenting unit 122 displays recommendation information on a digital signage 900 after the facial registration of the user. The contents to be displayed are, for example but not limited to, "10% OFF AT STORE B." A bonus applying unit 124 determines a bonus that is based on a bonus DB 114, as in the third example embodiment.

An operation of the information processing system 600a is similar to the one illustrated in FIG. 11. The facial authentication terminal 300A does not have to perform the settlement process at step S405 to step S407. The registering unit 126 registers the user ID of the user U subjected to facial registration and received at step S404 into the history DB 112 (step S408). The bonus applying unit 124 applies a bonus that is based on the history DB 112 to the settlement process of the user U authenticated successfully in second facial authentication.

In this manner, even in a case where facial registration, not facial authentication, is performed at a store A, advantageous effects similar to those provided by the third example embodiment described above can be provided. In other words, when a person who has undergone facial registration at a first store visits a second store, the information processing device 100a can apply a bonus to a settlement process of this person.

Herein, an individual may be identified by use of a technology other than the facial authentication technology. For example, an individual may be identified through a QR code (registered trademark) mapped to each user.

The foregoing example embodiments have been described as hardware configurations, but these are not limiting examples. The present disclosure can also be implemented via desired processes by causing a CPU to execute a computer program.

In the foregoing examples, a program can be stored and provided to a computer by use of various types of non-transitory computer-readable media. Such non-transitory computer-readable media include various types of tangible storage media. Examples of such non-transitory computer-readable media include a magnetic recording medium (e.g., flexible disk, magnetic tape, hard-disk drive), a magneto-optical recording medium (e.g., magneto-optical disk), a CD-ROM (read-only memory), a CD-R, a CD-R/W, a DVD (digital versatile disc), and a semiconductor memory (e.g., mask ROM, PROM (programmable ROM), EPROM (erasable PROM), flash ROM, RAM (random-access memory)). In addition, the program may be supplied to a computer by use of various types of transitory computer-readable media. Examples of such transitory computer-readable media include an electric signal, an optical signal, and an electromagnetic wave. A transitory computer-readable medium can supply a program to a computer via a wired communication line, such as an electric wire or an optical fiber, or via a wireless communication line.

It is to be noted that the present disclosure is not limited to the foregoing example embodiments, and modifications can be made, as appropriate, within the scope that does not depart from the technical spirit. The present disclosure may also be implemented by combining the example embodiments, as appropriate.

Thus far, the invention of the present application has been described with reference to some example embodiments (and examples). The invention of the present application, however, is not limited to the foregoing example embodiments (and examples). Various modifications that a person skilled in the art can appreciate can be made to the configurations and the details of the invention of the present application within the scope of the invention of the present application.

A part or the whole of the foregoing example embodiments can also be expressed as in the following supplementary notes, which are not limiting.

(Supplementary Note 1)

An information processing device comprising:
first authentication controlling means for causing an authentication device to execute first facial authentication or facial registration of a first photographed image capturing a user at a first store;
presenting means for presenting recommendation information related to a second store to the user in response to a success of the first facial authentication or in response to the facial registration;
second authentication controlling means for causing the authentication device to execute second facial authentication of a second photographed image capturing the user at the second store; and
bonus applying means for causing a bonus to be applied to a settlement process of the user at the second store based on a history of the first facial authentication or the facial registration, if the user has been authenticated successfully in the second facial authentication.

(Supplementary Note 2)

The information processing device according to Supplementary Note 1, wherein the presenting means presents, to the user, bonus information related to the bonus as the recommendation information.

(Supplementary Note 3)

The information processing device according to Supplementary Note 1 or 2, wherein the bonus applying means causes the bonus to be applied if an identifier of the user authenticated successfully in the second facial authentication is included in the history.

(Supplementary Note 4)

The information processing device according to Supplementary Note 1 or 2, wherein the history is a history of a first settlement process performed in response to a success of the first facial authentication.

(Supplementary Note 5)

The information processing device according to Supplementary Note 4, wherein the bonus applying means causes a discount to be applied as the bonus, the discount based on a monetary amount of the first settlement process mapped to the user authenticated successfully in the second facial authentication.

(Supplementary Note 6)

The information processing device according to Supplementary Note 4 or 5, wherein the bonus applying means causes the bonus to be applied if a monetary amount of the first settlement process mapped to the user authenticated successfully in the second facial authentication is determined to be no less than a predetermined amount.

(Supplementary Note 7)

The information processing device according to any one of Supplementary Notes 1 to 6, wherein the bonus applying means causes a discount to be applied as the bonus, the discount based on a monetary amount of a settlement process at the second store.

(Supplementary Note 8)

The information processing device according to any one of Supplementary Notes 1 to 6, wherein the bonus applying means causes the bonus to be applied if a monetary amount of a settlement process at the second store is no less than a predetermined amount.

(Supplementary Note 9)

The information processing device according to any one of Supplementary Notes 1 to 8, wherein the bonus applying means causes the bonus to be applied if a period of time during which the first facial authentication or the facial registration has been performed satisfies a predetermined condition.

(Supplementary Note 10)

The information processing device according to any one of Supplementary Notes 1 to 9, wherein the presenting means presents, to the user, a bonus condition related to the bonus as the recommendation information.

(Supplementary Note 11)

An information processing device comprising:
first authenticating means for executing first facial authentication or facial registration of a first photographed image capturing a user at a first store;
presenting means for presenting recommendation information related to a second store to the user in response to a success of the first facial authentication or in response to the facial registration;
second authenticating means for executing second facial authentication of a second photographed image capturing the user at the second store; and
bonus applying means for causing a bonus to be applied to a settlement process of the user at the second store based on a history of the first facial authentication or the facial registration, if the user has been authenticated successfully in the second facial authentication, (Supplementary Note 12)

The information processing device according to Supplementary Note 11, wherein the presenting means presents, to the user, bonus information related to the bonus as the recommendation information.

(Supplementary Note 13)

An information processing system comprising:
an authentication device including authenticating means configured to perform facial authentication;
a settlement terminal; and
an information processing device,
wherein the information processing device is configured to
cause the authentication device to execute first facial authentication or facial registration of a first photographed image capturing a user at a first store,
present recommendation information related to a second store to the user in response to a success of the first facial authentication or in response to the facial registration,
cause the authentication device to execute second facial authentication of a second photographed image capturing the user at the second store, and
apply, by use of the settlement terminal, a bonus to a settlement process of the user at the second store based on a history of the first facial authentication or the facial registration, if the user has been authenticated successfully in the second facial authentication.

(Supplementary Note 14)

The information processing system according to Supplementary Note 13, wherein the information processing device is configured to present, to the user, bonus information related to the bonus as the recommendation information.

(Supplementary Note 15)

An information processing method to be executed by a computer, the information processing method comprising:
causing an authentication device to execute first facial authentication or facial registration of a first photographed image capturing a user at a first store;
presenting recommendation information related to a second store to the user in response to a success of the first facial authentication or in response to the facial registration;
causing the authentication device to execute second facial authentication of a second photographed image capturing the user at the second store; and
causing a bonus to be applied to a settlement process of the user at the second store based on a history of the first facial authentication or the facial registration, if the user has been authenticated successfully in the second facial authentication.

(Supplementary Note 16)

An information processing method to be executed by a computer, the information processing method comprising:
executing first facial authentication or facial registration of a first photographed image capturing a user at a first store;
presenting recommendation information related to a second store to the user in response to a success of the first facial authentication or in response to the facial registration;
executing second facial authentication of a second photographed image capturing the user at the second store; and
causing a bonus to be applied to a settlement process of the user at the second store based on a history of the first facial authentication or the facial registration, if the user has been authenticated successfully in the second facial authentication.

(Supplementary Note 17)

A non-transitory computer-readable medium storing an information processing program that causes a computer to execute:
- a process of causing an authentication device to execute first facial authentication or facial registration of a first photographed image capturing a user at a first store;
- a process of presenting recommendation information related to a second store to the user in response to a success of the first facial authentication or in response to the facial registration;
- a process of causing the authentication device to execute second facial authentication of a second photographed image capturing the user at the second store; and
- a process of causing a bonus to be applied to a settlement process of the user at the second store based on a history of the first facial authentication or the facial registration, if the user has been authenticated successfully in the second facial authentication.

(Supplementary Note 18)

A non-transitory computer-readable medium storing an information processing program that causes a computer to execute:
- a process of executing first facial authentication or facial registration of a first photographed image capturing a user at a first store;
- a process of presenting recommendation information related to a second store to the user in response to a success of the first facial authentication or in response to the facial registration;
- a process of executing second facial authentication of a second photographed image capturing the user at the second store; and
- a process of causing a bonus to be applied to a settlement process of the user at the second store based on a history of the first facial authentication or the facial registration, if the user has been authenticated successfully in the second facial authentication.

REFERENCE SIGNS LIST 100, 100a INFORMATION PROCESSING DEVICE
101, 121 FIRST AUTHENTICATION CONTROLLING UNIT
101a FIRST AUTHENTICATING UNIT
102, 122 PRESENTING UNIT
103, 123 SECOND AUTHENTICATION CONTROLLING UNIT
103a SECOND AUTHENTICATING UNIT
104, 124 BONUS APPLYING UNIT
110 STORAGE UNIT
111 INFORMATION PROCESSING PROGRAM
112 HISTORY DB
113 RECOMMENDATION DB
114 BONUS DB
125 ACQUIRING UNIT
126 REGISTERING UNIT
130 MEMORY
140 COMMUNICATING UNIT
200 AUTHENTICATION DEVICE
210 FACIAL INFORMATION DB
220 FACE DETECTING UNIT
230 FEATURE POINT EXTRACTING UNIT
240 REGISTERING UNIT
250 AUTHENTICATING UNIT
300, 300A, 300B FACIAL AUTHENTICATION TERMINAL
310 CAMERA
320 STORAGE UNIT
330 COMMUNICATING UNIT
340 DISPLAY UNIT
350 CONTROLLING UNIT
351 AUTHENTICATING UNIT
352 RECOMMENDING UNIT
400 USER TERMINAL
410 CAMERA
420 STORAGE UNIT
430 COMMUNICATING UNIT
440 DISPLAY UNIT
450 CONTROLLING UNIT
451 PHOTOGRAPHING UNIT
453 REGISTERING UNIT
500 NETWORK
600, 600a INFORMATION PROCESSING SYSTEM

The invention claimed is:

1. An information processing device comprising:
at least one memory storing instructions, and
at least one processor configured to execute the instructions to:
control first facial authentication of a first photographed image of a user captured by a camera included in a first facial authentication terminal installed at a first store;
output bonus information related to a second store to a display included in the first facial authentication terminal when the first facial authentication succeeds;
control second facial authentication of a second photographed image of the user captured by a camera included in a settlement terminal installed at the second store; and
cause the settlement terminal to apply a bonus based on the bonus information to a settlement process of the user when the second facial authentication succeeds.

2. The information processing device according to claim 1, wherein the bonus is applied if a time of the first face authentication satisfies a predetermined condition.

3. The information processing device according to claim 1, wherein the bonus information includes a condition based on which the bonus is applied to the settlement process.

4. An information processing method comprising:
controlling first facial authentication of a first photographed image of a user captured by a camera included in a first facial authentication terminal installed at a first store;
outputting bonus information related to a second store to a display included in the first facial authentication terminal when the first face authentication succeeds;
controlling second facial authentication of a second photographed image of the user captured by a camera included in a settlement terminal installed at the second store; and
causing the settlement terminal to apply a bonus based on the bonus information to a settlement process of the user when the second facial authentication succeeds.

5. The information processing method according to claim 4, wherein the bonus is applied if a time of the first face authentication satisfies a predetermined condition.

6. The information processing method according to claim 4, wherein the bonus information includes a condition based on which the bonus is applied to the settlement process.

7. A non-transitory computer readable medium storing a program, the program causing a computer to execute:
- controlling first facial authentication of a first photographed image of a user captured by a camera included in a first facial authentication terminal installed at a first store;
- outputting bonus information related to a second store to a display included in the first facial authentication terminal when the first face authentication succeeds;
- controlling second facial authentication of a second photographed image of the user captured by a camera included in a settlement terminal installed at the second store; and
- causing the settlement terminal to apply a bonus based on the bonus information to a settlement process of the user when the second facial authentication succeeds.

8. The non-transitory computer readable medium according to claim 7, wherein the bonus is applied if a time of the first face authentication satisfies a predetermined condition.

9. The non-transitory computer readable medium according to claim 7, wherein the bonus information includes a condition based on which the bonus is applied to the settlement process.

10. The information processing device according to claim 1,
- wherein controlling the first facial authentication of the first photographed image of the user captured by the camera included in the first facial authentication terminal comprises controlling a database server to implement the first facial authentication, the database server being physically separate from the first store and in networked communication with the first store,
- wherein the first facial authentication terminal is configured to, by controlling the camera included in the first facial authentication terminal installed at the store, capture the first photographed image of the user and provide the photographed image to the database server,
- wherein controlling the second facial authentication of the second photographed image of the user by the camera included in the settlement terminal installed at the store comprises controlling the database server to implement the second facial authentication, the second store being physically separate from both of the first store and the database server and in networked communication with the database server.

* * * * *